Dec. 12, 1944.  H. L. FUOG  2,364,844
ANISEIKONIA DETERMINING AND MEASURING DEVICE
Filed Sept. 20, 1943
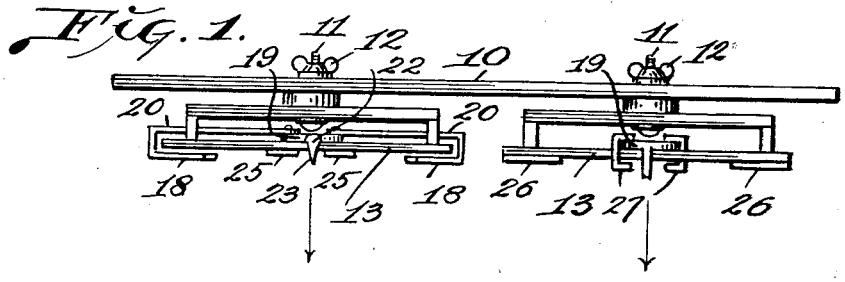
Fig. 1.
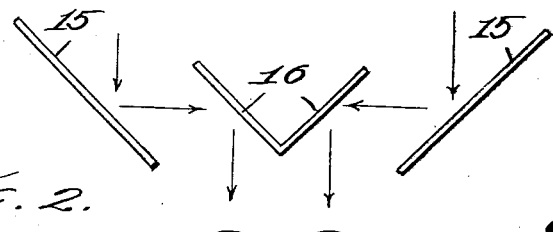
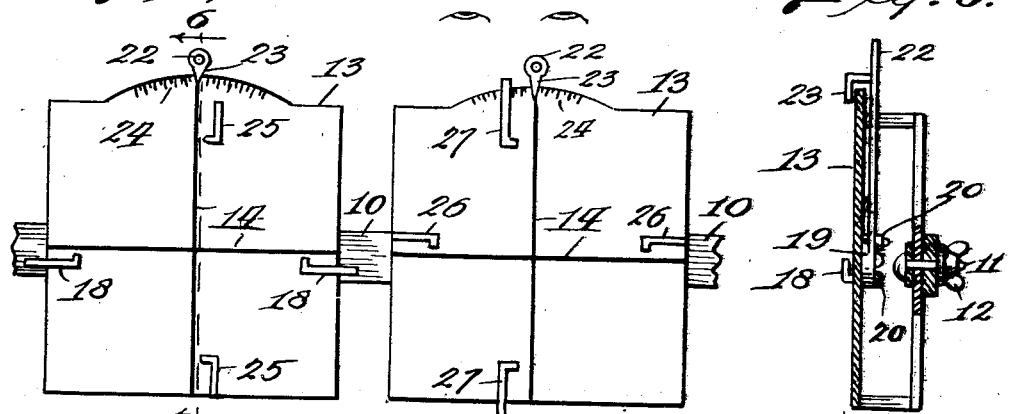
Fig. 2.
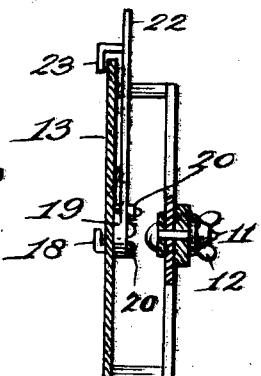
Fig. 6.
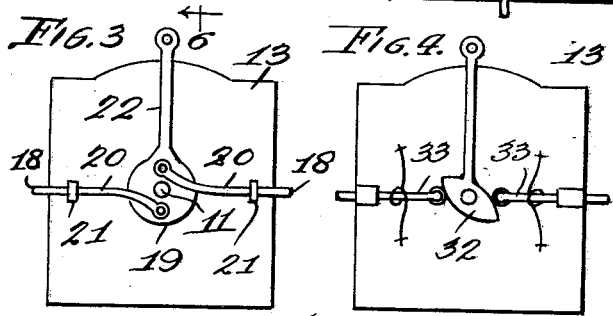
Fig. 3. Fig. 4.
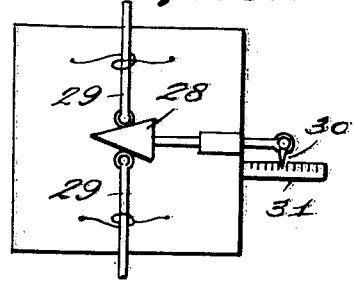
Fig. 5.
Fig. 7.
INVENTOR.
HARRY L. FUOG.
BY
Martin P. Smith
ATTY.

Patented Dec. 12, 1944

2,364,844

UNITED STATES PATENT OFFICE 2,364,844

ANISEIKONIA DETERMINING AND MEASURING DEVICE

Harry L. Fuog, Los Angeles, Calif.

Application September 20, 1943, Serial No. 503,041

8 Claims. (Cl. 88—20)

My invention relates generally to optical apparatus and more particularly to a simple, practical and inexpensive device which may be used for the accurate and comparatively rapid determination and measuring of aniseikonia, or that condition of vision, wherein the impression obtained from each eye differs in size and shape from that obtained from the other eye.

Aniseikonia, which is a visual phenomena and found in 70 per cent of persons tested, gives severe discomfort in seeing and promotes important alteration in many binocular visual judgments.

Determination and measurement of aniseikonia, for the purpose of providing corrective treatment, is dependent upon simultaneous binocular vision, together with means which permits each eye to view certain common elements in the field of regard, while each eye is permitted to see only certain other elements. These latter elements are the differentiating guides for comparison purposes between the right and left eye vision, while the former is to permit the necessary fusion or unification of the field of view.

Various forms of diagram designs have been developed and used in conducting tests for aniseikonia but, with very few exceptions, certain types of lenses are required to measure the per cent or degree of the aniseikonic discrepancy and such lenses, termed size lenses, have the property of magnifying, but not focus.

All known devices utilized for making aniseikonia tests, depend upon altering the existing size and shape of one or both eyes' retinal image in order to achieve equality, (iseikonia) with respect to size and shape of the mental impression obtained from each eye.

Among the principal objects of my invention are, to provide a simple, practical and easily manipulated aniseikonic testing and measuring device which does not require lenses and the use of which device is effective in materially shortening the time required to make tests by methods now generally used.

A further object of my invention is, to provide a measuring and testing device of the character referred to, wherein measuring indicators are physically moved relative to fixed lines or meridians disposed substantially at right angles to each other, so as to achieve alteration in visual impressions of size and shape for the examination of the presence and degree of aniseikonia.

With the foregoing and other objects in view, my invention consists in certain novel features of construction and arrangement of parts which will be hereinafter more fully described and claimed and illustrated in the accompanying drawing, in which:

Fig. 1 is a diagrammatic plan view of my improved apparatus.

Fig. 2 is a front elevational view of the eye charts.

Figs. 3, 4, and 5 are rear elevational views of different forms of the indicator actuating means.

Fig. 6 is a vertical section taken approximately on the line 6—6 of Fig. 2.

Fig. 7 is a diagrammatic view of a modified form of the apparatus.

Referring by numerals to the accompanying drawing, which illustrates a preferred embodiment of my invention, 10 designates a suitable support, upon which are mounted for independent rotary adjustment, by means of bolts 11 and nuts 12, a pair of panels providing charts 13, each having on its front face a pair of crossed meridians or lines 14 disposed at right angles to each other and which intersect each other at or near the center of the chart.

The axes of the frames or panels 13 are parallel with the medial line of vision thus permitting determination and measurement of aniseikonia in various angular positions across the field of view.

One simple and practical means for achieving super-imposition of the chart or diagram as seen by each eye, is a deflecting type stereoscope as illustrated in Fig. 1 and a modification thereof is shown in Fig. 7.

In the construction shown in Fig. 1, two reflectors 15 are disposed in angular positions of 45 degrees directly in front of the charts 13 with reflectors 16 occupying positions between said reflectors 15 and said reflectors 16 being in the line of vision of the eyes of the patient and thus the reflectors simultaneously transmit visual impressions of both charts and the lines and pointers thereon to the patient's eyes.

In the modified arrangement illustrated in Fig. 3 the charts 13 are disposed face to face, a suitable distance apart with reflectors 17 midway between said charts and occupying variable angular positions with respect to the charts and with respect to each other.

Other satisfactory means for transmitting the visual impressions of the charts and pointers to the eyes, may utilize refractive means, a combination of reflective and refractive means or lens combinations and arrangements.

Another method of testing, involves the use of projected polarized light while the observer peers through a polarized medium, termed the analyzer, thus permitting certain features of the field of regard to be common to each eye, while portion of the diagram projected by the polarized light is seen by each eye only.

One chart of the pair, for instance the left-hand one, has on the side portions of its face below the horizontal one of the meridians 14, pointers 18 which are mounted to move simultaneously toward and away from each other.

These pointers may be operated in various ways, for instance, by means of a disc 19 pivoted on the rear side of the chart and to which are pivoted the inner ends of pointer carrying arms 20 sliding through bearings 21 and said disc being operated by means of a handle 22. This handle may extend to a point just above the top of the chart and terminate in a pointer 23 which cooperates with a graduated scale 24 and thereby accurately register the degree of movement of the pointers (see Fig. 2).

The members of another pair of pointers 25 are fixed on the chart at top and bottom thereof, adjacent and on the right-hand side of the vertical meridian.

On the right-hand one of the charts, the pointers 26 which cooperate with the movable pointers 18, are fixed and disposed above the ends of the horizontal meridian and the pointers 27 which cooperate with fixed pointers 25 on the left-hand chart, are mounted for movement toward and away from each other adjacent the ends and to the left of the vertical meridian.

Vertically movable pointers 27 may be moved in any suitable manner, for instance, as seen in Fig. 5, by means of a sliding wedge 28 acting on the inner ends of spring held arms 29 which carry said pointers.

The arrangement and mounting of the fixed and movable pointers on the charts may be varied from the arrangement described, without affecting the accomplishment of the desired results for, in some instances, all pointers on each chart may be mounted for movement or all pointers on one chart may be fixed and all pointers on the other chart, movable.

The movement of the wedge and pointers may be registered by a pointer 30 carried by the wedge actuating arm and cooperating with a graduated scale 31.

In Fig. 4 I have shown a double eccentric 32 for simultaneous actuation of a pair of spring-held, pointer-carrying arms 33.

After ascertaining the measure and degree of aniseikonia, corrective lenses may be prepared.

My invention, without the requirement of lenses, provides simple and effective means for physically moving measuring pointers or indicators as required to enlarge or reduce the size and shape of the final visual impression.

The device permits enlargements or reductions of visual impressions by movement of the measuring indicators adjacent either one or both meridians of the charts or diagrams, which meridians are drawn so as to appear at right angles to each other and seen by each eye within the common field of view.

Thus it will be seen that I have provided an aniseikonia determining and measuring device which is simple in structure, inexpensive of manufacture and very effective in performing the functions for which it is intended.

It will be understood that minor changes in the size, form and construction of the various parts of my improved aniseikonia determining and measuring device may be made and substituted for those herein shown and described without departing from the spirit of the invention, the scope of which is set forth in the appended claims.

I claim as my invention:

1. In a device for ascertaining and measuring aniseikonia, a pair of charts, each bearing on its face crossed meridians, pointers mounted for movement toward and away from each other adjacent one of said meridians, fixed pointers located adjacent the other meridian with the fixed pointers of each chart occupying positions 90 degrees from the movable pointers of said chart, and 90 degrees from the fixed pointers of the other chart.

2. The device as set forth in claim 1 and with manually operable means for moving and indicating the degree of movement of said movable pointers.

3. The device as set forth in claim 1 and which charts are mounted for independent axial rotation and adjustment.

4. The device as set forth in claim 1 and reflective means for transmitting visual impressions of the charts and pointers to the eyes of the user of the device.

5. In a device for determining and measuring aniseikonia, a pair of practically identical charts, a pair of movable pointers and a pair of fixed pointers disposed substantially at right angles to each other on said charts with the movable pointers of one chart disposed 90 degrees from the movable pointers of the other chart and manually operable means for moving and registering the movement of said movable pointers.

6. A device as set forth in claim 5 and each chart mounted for independent rotary movement and adjustment.

7. A device for determining and measuring aniseikonia comprising a pair of charts, each having crossed vertical and horizontal meridians and pairs of fixed and movable pointers disposed adjacent said meridians with the fixed pointers of one chart disposed 90 degrees from the fixed pointers of the other chart, and means for transmitting the visual impressions of said charts and pointers to the eyes of the user of the device in superimposed relation.

8. The device as set forth in claim 7 and with manually operable means for correspondingly actuating the movable pointers of each chart.

HARRY L. FUOG.